July 19, 1960 A. M. CADDELL 2,945,670
ACTIVE-REACTIVE ENERGY APPLICATIONS FOR PRIME MOVERS
Filed July 21, 1955 2 Sheets-Sheet 1

LEGEND:
COMBUSTION GAS →
ATMOSPHERIC AIR →
MIXED GAS AND AIR →•→

INVENTOR.
Alfred M. Caddell

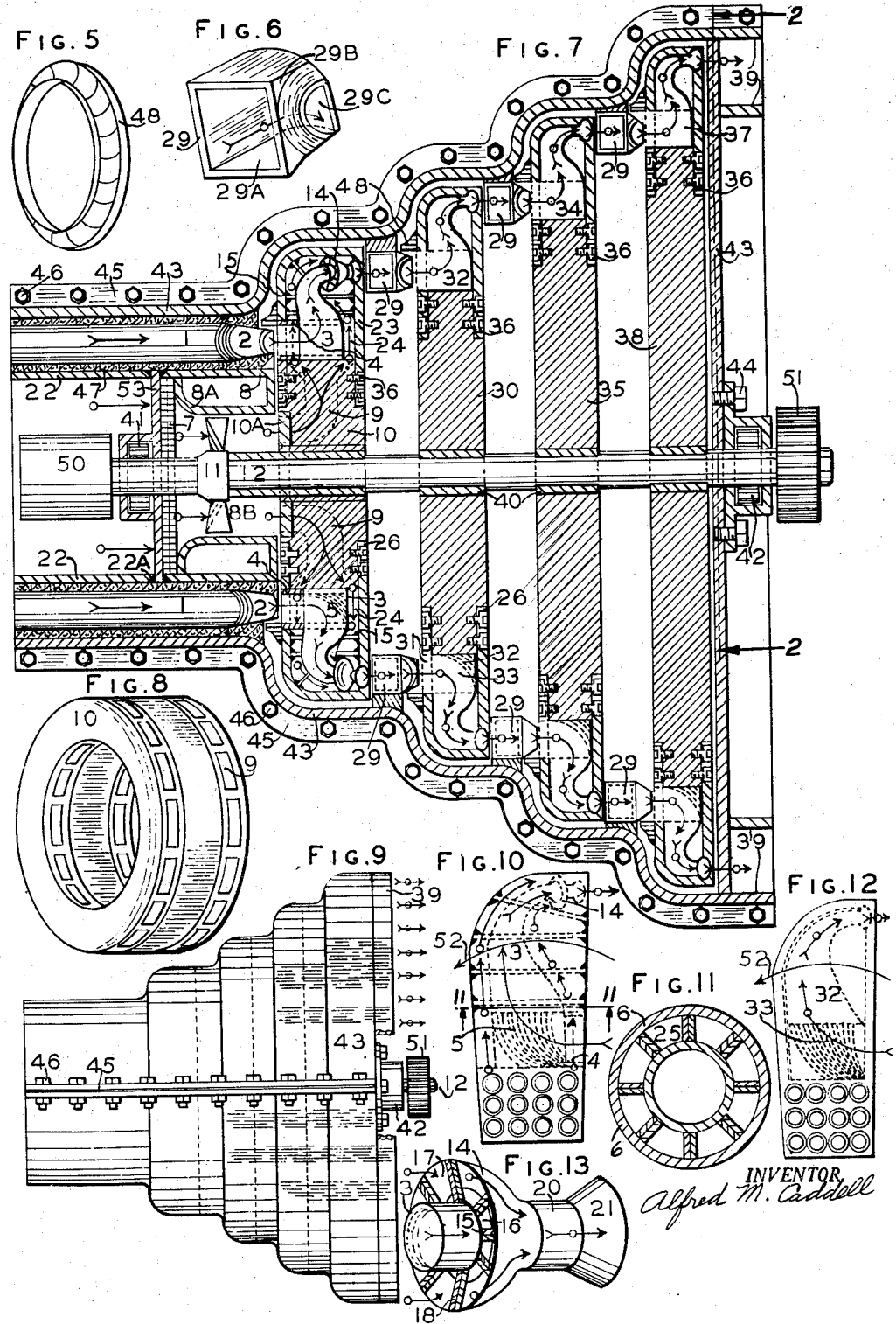

United States Patent Office 2,945,670
Patented July 19, 1960

2,945,670

ACTIVE-REACTIVE ENERGY APPLICATIONS FOR PRIME MOVERS

Alfred M. Caddell, 3117 N. Broad St., Philadelphia, Pa.

Filed July 21, 1955, Ser. No. 523,509

11 Claims. (Cl. 253—39)

This application is in part a continuation of pending application entitled Undiluted Temperature Gas Turbine, filed July 22, 1952, Serial No. 300,169, now abandoned; which application, in turn, was in part a continuation of application entitled Mutually Assisting Power Plants in Combination, filed April 4, 1951, Serial No. 219,232, now abandoned.

In the powerplant field, the demand has always been for more power from an engine, reduced dimensions of that engine and lighter weight. As in the previous applications therefor, the object of the present invention is to fulfill that demand by mounting shell-like bucket-within-a-bucket constructions on the periphery of a turbine wheel for converting heat energy into maximum mechanical energy via the simultaneous employment of energy both directly and reactively within said constructions. In a sense, this direct and reactive employment translates into a double application of energy per single application, which should enable such a turbine to deliver an enormous increase in power output per size, weight and cost in fuel.

Clearly, where the energy-converting means is a gas turbine, the employment of high-temperature fluid against bucket surfaces in order to obtain maximum expansion effect calls for measures to safeguard the turbine from destruction. For the temperatures to be had from the burning of a hydrocarbon fuel in air approximates 4,500 degrees F., which is three times as great as the temperature now possible to employ in gas turbines. Presently these engines are obliged to operate within maximum safety limits of 1,500 to 1,525 degrees F.

The prime mover described herein is designed to operate in the highest efficiency range. In keeping with well-established law, the higher the head of heat the greater the power output that results from its fall to the prevailing atmospheric temperature level. Furthermore, the nearer or the quicker to the source of heat that such work can be performed, the greater the power output for a given quantity of fuel and size of powerplant. For, in the process of converting heat into work, micro-seconds play an all-important part inasmuch as peak temperatures drop precipitously from the moment of their inception. In a sense, heat being synonymous with work, the quicker that it can be converted into work the greater will be the power output per unit of heat employed. The internal combustion engine provides an example of the importance attached to a micro-second in the conversion of heat into work, a thousandth of a second or a slight adjustment in timing of the ignition making a tremendous difference in the engine's performance.

This invention may be adapted to either steam or gas turbine practice, including that of compound turbo use in connection with reciprocating engines, and is specifically employable for shaft take-off, not jet propulsion, purposes. In order to set forth the features thereof to the best advantage, the gas turbine type of powerplant has been selected.

*Comparison with present-day turbines*

In present-day gas turbines, whether used to drive a dynamo or power a locomotive or drive an airplane via turbo-prop or jet propulsion means, it is quite necessary to dilute the temperature of the gas before entry to the turbine to prevent the blades from creeping or changing their efficiently prescribed contour or actually flying apart; to which temperature factor may be added the limitations imposed by centrifugal force which is generated under high-speed rotation and which increases as the square of the velocity, creating radial pulls on the turbine wheels that register in hundreds of tons. But although absolutely necessary in present designs, from the standpoint of power output such temperature dilution constitutes a major handicap, greatly limiting the possible efficiency of this type of powerplant.

As above mentioned, the highest temperature that can safely be employed in a conventional turbine is about 1,500 degrees F., which automatically translates into the unavoidable situation that two-thirds of the heat energy in the gas has to be sacrificed even before the remaining one-third can be used. (In the case of jet propulsion this dilution air converts into thrust, albeit weakened which, to make it more effective, requires the addition of more fuel via an after-burner.) Then, too, when employed in shaft take-off installations, another costly handicap shows up in gas turbines. Three-fourths of the power that the engine is permitted to develop from the above-mentioned one-third is absorbed in providing sufficient air for combustion purposes and for lowering the temperature of the gas to within safe operating limits. The volume ratio generally runs 60 parts of air to 1 of combustion gas. Many turbines in use call for 60 pounds of air per second, which to obtain this voluminous quantity, necessitates employing a high-speed, large-capacity blower which, in order to compress air at a compression ratio of 4 to 1, consumes the aforesaid three-fourths of the power developed by the turbine. This leaves one-fourth of the energy that the above limitations permitted to be generated to go into useful work and drive the engine's accessories.

As a further handicap, this compressor-delivered air is far from cool. Without taking frictional and combustor-proximity temperatures into consideration, at 4 to 1 compression ratio 80 degree (F.) air becomes 320 degree (F.) air prior to its use as a coolant; which temperature is about 1½ times that of boiling water and which constitutes a burden for an already handicapped engine to carry.

*Employment of maximum combustion gas temperature*

Obviously, the foregoing limitations make it impossible to realize the potentials inherent in the law that the greater the head of heat the greater the amount of work that will result from its fall provided that a prime mover is specifically designed to efficiently convert such energy into work and that there is no appreciable lapse of time, measured in micro-seconds, between its inception and its employment. By way of contrast with present-day turbines, the prime mover herein described utilizes the full temperature of the gas generated in the combustors, no direction-guiding diaphragm being employed and no dilution air whatever being mixed with it prior to its impingement against bucket structures mounted on the periphery of a wheel; hence the energy in the gas is not purposely dissipated before it has a chance to do work. But before describing how the wheel and its buckets are protected from the heat that otherwise would surely destroy them, it may be appropriate to cite other phases of current turbine practice inasmuch as, by contrast, they point up the advantages inherent in the present invention.

Total axial flow in steam and gas turbines

As an example, the conventional steam turbine may be cited. To obtain maximum horsepower from this type of powerplant it is necessary to pass superheated steam through eleven or more stages depending upon the degree of superheat and the head pressures employed. In such practice, the steam, after being deflected off diaphragm vanes interposed between the generator and the turbine, impingements against the turbine blades at an angle, then passes between them and strikes curved stator blades and again deflects angularly to strike the blades of the second stage wheel, then in similar sequence the steam impinges against a third, then a fourth stage and so on, the steam traveling in a very much restricted and subtantially axial direction, weaving in serpentine manner between the rotor and stator blades throughout the turbine's stages.

Of singular significance, too, is the matter of centrifugal force that builds up in the fluid being centrifuged off the blade tips during high-speed rotation. With an elastic fluid under high pressure striking the blades at a velocity of, let us say, 1,800 feet per second and the peripheral speed of the blades totalling many hundreds of feet per second, the resultant centrifugal force carries with it, potentially, a very powerful effect. Yet no advantage whatever is taken of this force such as by converting it into power via reaction. Also, no advantage is taken of the force that can be created by obliging high-speed, high-pressure fluid to change its direction while flowing through a turbine bucket, such as is herein described. Present-day gas engine practice follows that of steam engine practice, the gas being routed through the turbine in a radially restricted, substantially axial direction, the familiar stator to rotor to stator to rotor pattern.

Utilization of centrifugal force and reactive pressures

In contrast to such limited force applications, in this invention the important factors of primary fluid impingements, centrifugal force and reactive pressures are harnessed simultaneously to drive the turbine prior to the fluid being discharged from the confines of the buckets. Even further reactive drive is attained upon discharge of the gas at greatly increased velocity pressure, due to the converging construction of the buckets themselves and the employment of converging-diverging nozzles that direct the fluid against flow-reversing stator cups interposed between the several turbine stages. Moreover, the additional pressures so attained are available in all the stages of the turbine; all of which is in fullfilment of the demand calling for more power output from a specific size and weight of powerplant and in keeping with the law that the quicker that maximum temperature can be converted into power the greater the power output will be.

Protective cooling of wheel and buckets

As hereinabove pointed out, in present-day gas turbines temperature dilution air is required to lower the temperature of the combustion gas before entry into the turbine. But, also pointed out, safeguarding the turbine structures in this manner costs two-thirds of the engine's initially potential power output, and three-fourths of the power that is allowed to be converted from the depleted remainder is consumed in driving a blower to provide this dilution air.

Differing from the foregoing practice, as much temperature dilution air as is required can be had by means of the present invention at no sacrifice at all in the initially generated combustion temperature, at no cost at all in compressor equipment for dilution air and at no cost at all in power. Moreover, atmospheric air of ambient temperature, whether at zero degree, or 60 or 100 F., can be had in any desired quantity to effect maximum temperature dilution. Entering the engine via its central section and passing radially through the wheel, this cold air keeps the turbine wheel cool, thus maintaining its tensile strength under high-speed rotary motion. Further, this air does not mix with the gas until after the gas has accomplished its primary action-reaction expansion work in the buckets of the first-stage wheel; and further, also, the heat transferred convectively from the gas to the air is employed to bring about additional turning effort by being discharged restrictively from the buckets through a converging-diverging nozzle that converts expansion pressure in both the gas and the heated air into velocity pressure, which heated air in passing through said nozzle is also entrained by the combustion gas, mixed with it in the nozzle and directed to strike stator cups closely positioned to the buckets' discharge orifices, thus increasing to a very considerable extent reactive drive of the turbine.

In this connection, centrifugal force, which is inherent in all rotary motion and which increases into a tremendous form of energy in turbine operation, makes of the turbine buckets an equal number of high-powered centrifugal pumps, inducing atmospheric air to flow at high velocity all around the gas-conveying inner bucket of the bucket-within-a-bucket construction and thus absorb by convection sufficient of the heat units to prevent destruction of the buckets. Ordinarily, static air is a poor conductor of heat for its molecules do not transmit heat readily from one to another, but if, on becoming heated it is replaced by a voluminous flow of new air, hot gas will surrender its heat to the air at a prodigious rate. Practically all aircraft engines are cooled via the principle of convection.

Mounting of the turbine wheels

In the convential turbine, as previously referred to, travel of the gas is substantially axial whereas in the turbine of this invention it is both radial and axial, with emphasis on the radial, each wheel with its respective buckets having a radius greater than that of its predecessor wheel. Moreover, the travel of the gas within each set of buckets is progressively radial and centrifugally powerful. Directed into the base section of the inner buckets of the first-stage wheel it travels under increasing pressure therethrough and is discharged under increased velocity pressure at the bucket's periphery at an angle of approximately 45 degrees, striking closely positioned stator cups. These cups reverse its flow via a curving back, whereupon a converging terminus re-directs it at a discharge angle, relative to the intake end of the buckets, of 45 degrees into the base section of buckets mounted on a second-stage wheel, from the periphery of which it is discharged into the base section of a third wheel, and so on throughout successive turbine stages.

By means of this invention, therefore, it should be possible to develop in four stages as much power from a given quantity and head of heat that otherwise would require eleven or more stages of a present-day turbine to develop; which result would translate into a great saving in powerplant size and weight. Or, for a desired power output a smaller powerplant, with a proportionate saving in fuel, would automatically suffice.

Silent turbine operation

It is obvious, too, that a great, if not total, absence of noise would attend operation of this new form of powerplant. Noise results from the reactive closing of air pockets which are formed by high-velocity gas rupturing the atmosphere. With conversion of practically all of the heat into work and the impotent residual gas exhausting from the last stage buckets angularly against a wall open at its rear, very little velocity would be left in the gas to puncture the atmosphere. Consequently, there would be no sudden reactive closing, and little, if any, noise.

Other objects and advantages in and associated with this invention will become apparent as the herein description proceeds.

In the drawings:

Fig. 5 is a three-quarter view of a canopy ring that protrudes outwardly over the bucket apertures of the several wheels, which canopy is identified as 48 and seen frontally in partial form in Fig. 1 and in cross section in Fig. 7.

Figure 1:
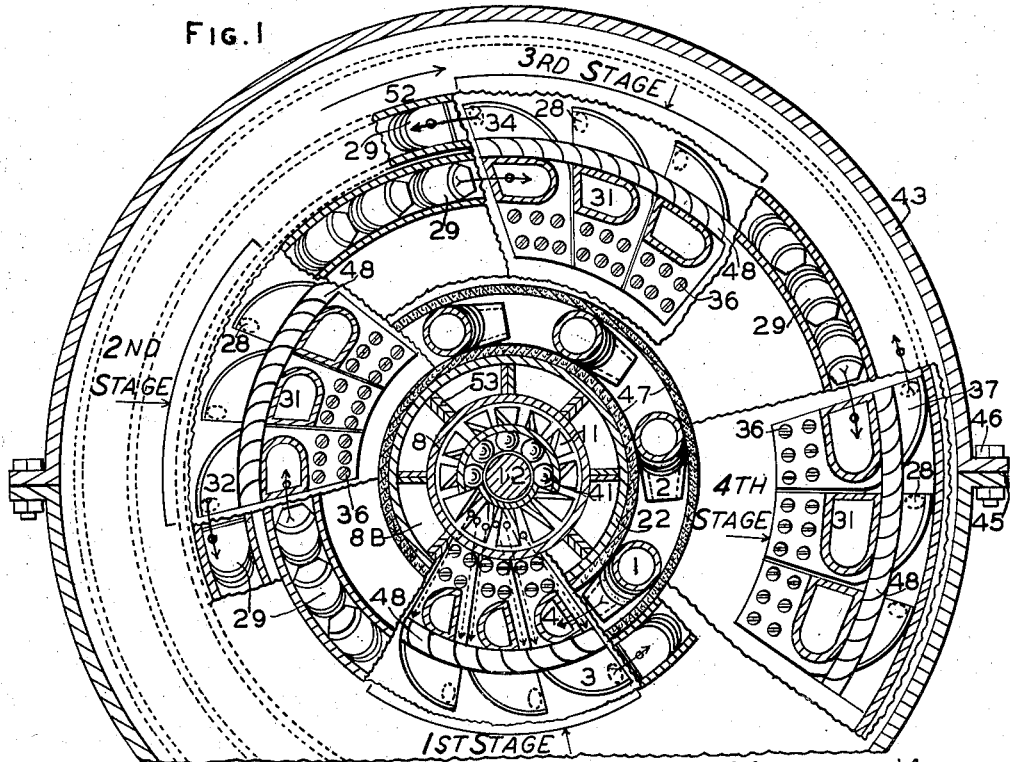
Fig. 1 is a frontal, cutaway view showing the several stages of the new prime mover. The first stage has the least radius, the second stage a greater radius, the third still greater and the fourth the maximum radius, which radius increase is shown in corresponding elevation in Fig. 7.

Fig. 6 is an enlarged three-quarter view of stator cup formation 29, shown in position in Figs. 1 and 7. It will be observed herein that the intake, identified as 29A, Figs. 6 and 7, has a much larger area than that of the discharge aperture, identified as 29C.

Fig. 7 is a side view of the complete turbine engine shown in cross-section, wherein the relation of the combustors in the buckets and the buckets to the interstage stator cups and the progressively increased diameter wheels are shown.

Figures 3, 4:
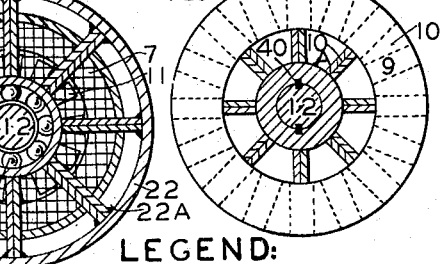
Fig. 3 is a frontal view of the central section of the turbine as illustrated partially in Figs. 1 and 7, showing in particular the axial shaft, anti-frictional supporting bearings, the bell-mouth entrance of the air chamber, the impeller therewithin, supporting spoke-like members and protective screening.
Fig. 4 is a frontal view of the first-stage turbine wheel, identified as 10, Fig. 7, wherein is shown spoke-like construction 10A that permits air passageways 9 therebetween and, in dotted outline, a continuation of said passageways through the first-stage wheel, which are passageways also shown in Fig. 8.

Fig. 8 is, compared to Fig. 7, an enlarged three-quarter view of first-stage wheel 10, wherein is shown air passageways 9, also shown in dotted outline in Fig. 4 and in Fig. 7.

Fig. 9 is a half-size, external side view of the complete turbine engine.

Fig. 10 is an enlarged view of a first-stage wheel bucket, wherein may be seen the entrance aperture 4 and, in dotted outline, the pocket-receiving section in the inner bucket's base and a helical, converging continuation of the inner bucket structure and its nozzle facing toward the discharge orifice at the bucket's periphery.

Fig. 11 is a view of a supporting spider employed to secure the inner bucket to the outer bucket, which view is taken on the lines 11—11, Fig. 10. Similar spider constructions are shown in Fig. 7. This component may assume any shape desired in order to fulfill its supporting and air-passing functions.

Fig. 12 is a side view of a second-stage wheel bucket, which bucket is also appropriate for the third, fourth and any subsequent stages that may be employed. In this view is shown, in dotted outline, a receiving pocket identified as 33, the arcuate end of the bucket advancing in the direction of rotation, as per arrow 52, while the propulsive fluid is discharged at the bucket's periphery in a direction opposite to that of the wheel's rotation.

Fig. 13 is an enlarged view of a converging-diverging nozzle wherein is shown in fragmentary form the terminus of the inner bucket, the spoke-supporting arrangement permitting passage of dilution air therebetween, the converging throat and diverging discharge end; also, a bell end for promoting a Venturi effect and a directional arrow 20 which signifies mixture of the combustion gas and dilution air prior to its joint discharge therefrom. A miniature view of this nozzle, identified as 14, is shown in Figs. 7 and 10, wherein appropriate arrows detail the flow of air around the flare and an arrow (forked tail) indicating discharge from the inner bucket of combustion gas into the nozzle.

Figure 14:
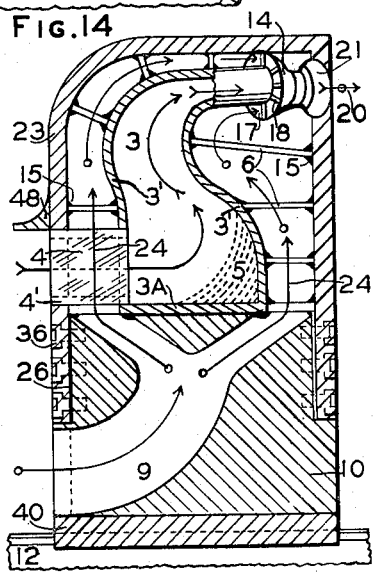

Fig. 14 is an enlarged view of one of the structures comprising the outer and inner buckets, showing the relation of each bucket to the other. For the most part, the inner bucket is shown in cross section, the walls thereof being identified as 3' and the interior of the bucket as 3. In this view, also, conduit walls 4', which occupy aperture 4, are made distinctive by shading so that its outer side structure will be obvious compared to other features of the bucket. The forked arrow representing gas from combustors is shown passing through the conduit in dotted outline, whereas solid cooling-air arrows 24 pass over the outer surfaces of the conduit. This passage of cooling air is also indicated by arrows shown in dotted outline air in the buckets of the first stage, Fig. 1.

Combustion gas resulting from the burning of a hydrocarbon fuel in air is generated in combustors, such as are shown partially at 1, Figs. 1 and 7, the gas-generating features of which are not illustrated. Forked arrows indicate the directional flow of the gas. Inasmuch as the main parts of the combustors are positioned at an angle of 90 degrees relative to the turbine wheel, half of that angular relation is provided by the combustors' termini, such as that indicated by 2, Fig. 7, which directs the gas at an approximate 45-degree angle of impingement against inner buckets 3 of the first-stage wheel 10, formed by walls 3' and base 3A as shown in Fig. 14. This gas passes through aperture 4, formed by conduit walls 4', shown in dotted outline in Figs. 10 and 14, which walls, as shown in the above figures, are distinct from the walls comprising the outer bucket proper in order that cooling air as represented by arrows 24 flowing therearound will permit safe introduction of what otherwise would be destructive temperature gas entering the inner bucket. Upon passing through these apertured walls, said high-temperature gas strikes directly against pocket 5 in the buckets' base section which, as shown in Figs. 10 and 14, is twisted to present a curved frontal surface for the reception of said gas impingements; after which the bucket assumes an arcuate, helical and tapering construction for attaining the following results:

(1) Direct response to the gas impingements thereagainst, causing instant rotation.

(2) Reactive response in the direction of rotation, the gas under high pressure exerting force against the curved, tapering wall throughout the radial length of the bucket prior to its discharge therefrom in a direction opposite to that of rotation.

(3) Inasmuch as the gas is introduced into the inner buckets on the side nearest the combustors, in order for these buckets to transfer it to buckets on a second-stage wheel the gas discharges from the opposite side of the buckets at the junction of the side with the trailing end at an angle relative to the orbit of the wheel and in a direction opposite to that of the wheel's rotation. These requirements, plus the fact that cooling air must be kept separate from the gas up to the termini of the inner buckets, dictate that the bucket constructions shall be closed from the periphery of the intake aperture to the buckets' peripheral juncture with dual-purpose mixing and velocity-changing nozzle 14, and that while the buckets' construction curves radially it must also assume a spiral or twisting formation to transfer the gas from one side thereof to the other and from the end advancing in the direction of rotation, to the trailing end.

(4) As a means to insure that centrifugal force acquired by the gas during high-speed rotation shall be thoroughly harnessed in this prime mover, the bucket construction tapers from inlet to outlet throughout its radial length. Thus the expansion velocity of the gas that is lost upon its establishing contact with the pocket of the bucket is, to a very considerable extent, recovered by means of this tapered construction and the ever-increasing centrifugal force that is built up in the gas from the bucket pockets to their peripheries.

Figure 2:
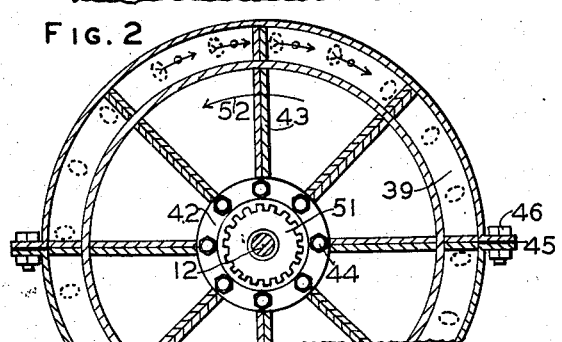
Fig. 2 is, compared to Fig. 1, an approximate half-size view of the prime mover taken on the lines 2—2, Fig. 7.

(5) Coincident with such change-in-direction pressure and the change from expansion to velocity pressure in the gas within the buckets, upon its being discharged therefrom through nozzles, about which more later, in an angularly direction opposite to that of rotation, it is directed against stator cups, thereby contributing further reactive drive to the wheel. Fig. 2 shows the combustion gas and air being discharged from the orifices of the buckets, in dotted outline, while curving arrow 52 indicates the direction of rotation of the wheel.

At this juncture, the matter of cooling air for maintaining at a safe operating level the temperature of the inner bucket through which red hot gas is passing, calls for attention. Whereas, as previously stated, in the conventional gas turbine dilution air is mixed with combustion gas before it is even attempted to convert its energy into work, thereby killing two-thirds of its initial expansion pressure, in the present invention dilution air is mixed with the gas after, and only after, the gas has accomplished its initial expansion directly and reactively within the inner bucket of the first-stage wheel. In the meantime, the wheel and its buckets are being saved from destruction, for a sufficiently large volume of atmospheric temperature air is passing swiftly and radially over the surface of the inner bucket, which is, completely enveloped by said air. Whereupon the heat that is given up convectively to this air is subsequently harnessed to do expansion work against successive stages of wheels. It will be seen, therefore, that functioning of this engine hinges on the interdependent relation of one bucket with the other.

This temperature-reducing air enters the engine centrally from atmosphere through spaces provided between spoke members 53, then through screening 7, Figs. 3 and 7, and passes through air chamber 8B formed by annular wall 8 to enter passageways 9 shown in dotted outline in first-stage wheel 10 Fig. 4 and also shown openly in Fig. 14. This wheel may be of solid construction with passageways appropriately made available therethrough, as in Figs. 8 and 14. Spoke members 53 may be welded to annular wall 22, as at 22A Figs. 3 and 7.

In passing through chamber 8B, the air, which is under powerful centrifugal suction pressure, encounters the blades of impeller 11, mounted on shaft 12 of the engine, thus imparting to the blade considerable windmilling effect. Should this engine be mounted in a vehicle traveling at high speed through the air, the ram pressure encounted at such travel speed would, upon striking these impeller blades, become translated into driving power for assisting in the turbine's rotation. A bell-mouth construction 8A of annular wall 8 is provided to assist in obtaining maximum ram pressure with a minimum of air friction.

In fluid dynamics it is well known that if a compressible fluid, such as combustion gas or steam, is first caused to converge and then diverge by means of a nozzle, expansion pressure in the fluid will be converted into velocity pressure upon its passing through the throat of the nozzle. Such conversion results in a more powerful driving effect against opposing surfaces than could be had if the nozzle did not have a converging-diverging formation.

In addition to this increased driving effect, the nozzle described herein embodies other useful features. By referring to Figs. 7, 13 and 14 it will be seen that this nozzle 14 encompasses the closed wall comprising inner buckets 3 adjacent their peripheral termini and is secured thereto by welding. This nozzle may also be secured to the outer bucket by welding means.

It will be observed that the end of the bucket as shown in Fig. 13 extends into the nozzle, which bucket is fitted with a flared end 16 on the far side of the nozzle spokes. This nozzle functions as follows:

It provides spaces, as indicated by 17 between spokes 18, Figs. 13 and 14, for the passage of air under centrifugally induced suction pressure to flow to the interior thereof. As shown by flow arrows, after entering through the nozzle's bell-mouth, the air converges towards its comparatively narrow throat which has the same diameter as the terminus of bucket 3, an end of which is shown entering the nozzle. Upon passing into the nozzle this air becomes deflected by flared end 16 which causes a venturi effect inside the bell-mouth. And inasmuch as the velocity of the gas issuing from the bucket's terminus exceeds greatly the speed of the air being drawn into and through the nozzle by centrifugally induced suction pressure, the gas entrains the air as per arrow 20 and lends to it an increase in speed for subsequent discharge through divergent terminus 21 and through orifice 28 against interstage stator cups 29.

Outer bucket 23 supports inner bucket 3 by means of spiders 6 which are shown in position and preferably welded, as indicated at 15 in Figs. 7, 10 and 14, while a separate view of said spider is shown in Fig. 11. Although presented as circular in this figure, spiders 6 also shown in in Fig. 14 may have any shape required by the outline of the inner bucket in order to lend adequate support thereto. The air passing spaces in this spider are indicated by 25, Fig. 11.

Figs. 1 and 7 show mounting of the buckets on the first and subsequent stages of wheels, while Figs. 10, 12 and 14 show construction of the buckets which permits them to straddle the wheels at recesses indicated by 26 Figs. 7 and 14 in the wheel walls and occupied in the above figures by the extended sides of the buckets, which are removably secured to the wheels by a plurality of screw bolts 36, Figs. 1 and 7. Openings 9 in wheel 10, as shown in Fig. 8, are matched by openings in the bases of the first-stage wheel buckets 3, atmospheric air passing through space 3 around the conduit 4 comprising aperture 4 and between the inner and outer buckets, the flow of the air around the inner bucket being indicated in Figs. 7, 10 and 14 by arrows having a small circle on their ends. Arrow 24 indicates flow of cooling air around this conduit.

Due to the difference in radius between the inlet of air from chamber 8B and the peripheral outlet at the terminus of nozzle 14, upon rotation of the wheel assembly a centrifugal pump effect is created throughout the air flow system, the radial throw of the air causing a powerful suction from atmosphere through this chamber. This suction assures a large continuing volume of air passing through the space between the buckets, the air absorbing heat by convection from the shell-like wall of the inner bucket as the gas passes inside and the air outside of said wall.

As aforesaid, the mixture of gas and air discharges from the diverging end of nozzle 14 which protrudes through orifice 28 in at the peripheral juncture of the closed side and the trailing end of the outer bucket.

As shown in Figs. 1 and 7, a ring of stator cups 29 is mounted on the inner wall of casing 43 and positioned between first-stage wheel 10 and second-stage wheel 30. An enlarged view of a single stator cup, identified throughout the assembly as 29 is illustrated in Fig. 6. As shown in Fig. 7, this ring of cups is located in close proximity to and at the same radius as that of nozzle 14 of the first wheel's buckets and, also, on the discharge side of the cups at the same radius as aperture 31 of buckets 32 of the second-stage wheel, through which aperture the mixture of gas and air passes to strike against pocket 33 formed in the base of the concave rear wall of bucket 32.

Stator cups 29 have a comparatively large-size intake 29A and are closely positioned to each other, as shown in Fig. 1, to receive in an unbroken stream as possible the gas discharged by the buckets of the several wheels. Inasmuch as these stator cups are alike irrespective of their location, they are identified in all positions by the numeral 29. The receiving section of these cups face at an angle approximately 45 degrees relative to mounting of the wheels and are positioned directly opposite the discharge end 21 of nozzle 14 which, as aforesaid, also discharges at an angle of approximately 45 degrees through orifice 28 in order to effect discharge against said stator cups as directly and frontally as possible. As illustrated in Fig. 6, inner wall 29B of these cups has a sweepingly round contour, and the gas, after being turned therein, issues through converging discharge end 29C, whereupon it is directed toward the pocket 33 in the base section of second-stage wheel bucket 32, a view of which is shown in Fig. 12.

This type of bucket is shown mounted on wheels 30, 35 and 38, Fig. 7. On wheels 35 and 38 it is identified as 34 and 37 respectively. It has four walls comprised of two ends and two sides, Fig. 12, which walls carry therein and support arcuate, shell-like structures 32, 34 and 37 which have receiving pocket 33 in their basal ends, said pocket merging into the rest of the bucket structures. From the maximum radial boundary of apertures 31 of bucket 32, which also applies to buckets 34 and 37 on wheels 35 and 38 respectively, the structure continues radially, twistingly and at progressively reducing cross section to describe an arc from its base to its periphery, the peripheral end thereof terminating in orifice 28, Fig. 12, formed at the juncture of said bucket ends and sides. After striking against these buckets, the arcuate end wall thereof opposes the expansion pressure and radial throw of the gas-air mixture, thereby causing powerful internal reactive drive. This mixture then discharges through orifice 28.

Stator cups 29, positioned between the second and third-stage wheels 30 and 35 respectively, Fig. 7, receive the gas-air mixture from the second-stage wheel, turn it within their confines and discharge it into buckets 34 mounted on third-stage wheel 35 and secured thereto by a plurality of screw-bolts 36. Buckets 34 have a construction similar to buckets 32 and transfer the gas-air mixture via stator cups 29 to buckets 37 mounted on the next increased diametered wheel 38, to which they, too, are removably secured by bolts 36. Inasmuch as the construction of the buckets and the wheels from the second stage on are identical except for an increase in their diameters, it is believed that further description thereof and that of their functioning would be wholly repetitive.

Upon being discharged from the buckets mounted on the wheel having the most increased diameter, disposition of the energy-depleted gas may be made by deflecting it rearwardly against the inner surface of annular wall 39 which extends as a continuation of casing 43. Discharge of said energy-depleted gas over such an extensive area should take place at a velocity low enough to prevent the formation of exhaust noise and would contrast most favorably with the noise that accompanies operation of gas turbines employed in jet propulsion installations.

The assembly of wheels is mounted on shaft 12, Fig. 7, by means of keys 40. This shaft is supported by bearing assembly 41 on the forward end and bearing assembly 42 on the rear end. The assembly housing that supports these latter bearings is secured to casing 43 by means of screw bolts 44.

Casing 43 is of split half construction, as is indicated by flanges 45, to facilitate ease of assembly, the half sections thereof being secured to each other by a plurality of screw bolts 46, Figs. 7 and 9.

Reverting to combustors 1, inasmuch as maximum temperature of the combustion gas from the moment of its inception to its delivery at the turbine is desired, these combustors are insulated by annular wall 47, Figs. 1 and 7, which wall may be of any composition that has heat-retaining properties. Wall 47 abuts casing wall 43 and encompasses the combustors.

Also, in order to confine the gas to the arc described by the termini of the combustors and to prevent leakage between the moveable rotor and the stationary combustors, canopy ring 48 extends outwardly from and is mounted on the side of the buckets facing said combustors. This ring is shown in Figs. 1 and 7, and separately in Fig. 5.

Casing 22 is supported on its forward end by spoke members 53, Fig. 7, which may be secured by welding such as at 22A. These spoke members are also shown in Fig. 3. Besides lending support to the forward part of the engine, it also houses bearing assembly 41 which, in turn supports shaft 12.

Starter 50 is shown in conventional position on the forward end of shaft 12, and spur gear 51, indicating shaft take-off means, is shown mounted on the rear end of the rotor shaft.

Applicant believes that the foregoing description is essentially complete and that it conveys the workability of this new form of economical, high-energy-output prime mover. Modifications may of course be made in the foregoing description without departing from the spirit and scope of the appended claims.

Having described my invention, I claim:

1. In an engine for converting the energy in an elastic fluid into power, an assembly of turbine wheels mounted on a shaft in increasing diametered stages, a first-stage wheel and a plurality of structures mounted peripherally thereupon, each structure being comprised of a shell-like inner and a shell-like outer bucket with an air space therebetween, said first-stage wheel having a central hub portion, a plurality of channels in said hub portion opening to atmosphere and extending radially through the periphery of said wheel, said outer buckets having a base straddling the periphery of said wheel and having a front and a rear side and an advancing and a trailing end wall relative to the direction of rotation, a conduit forming an intake aperture in the front side of said outer bucket facing a supply of said fluid, said conduit extending into said inner bucket, openings in the base of the outer bucket matching said channels in said wheel for permitting air induced by centrifugal suction pressure to flow around said conduit into the space between said buckets, said inner bucket likewise having walls comprising a base, a front and a rear side, an advancing and a trailing end, said advancing end having a pocket formed in the basal section thereof facing said conduit aperture for receiving the impingement of said fluid thereagainst, said advancing end and the bucket's other walls thereafter continuing arcuately and helically toward the peripheral juncture of the rear side and the trailing end of the outer bucket, a nozzle secured between the radial ends of the inner and outer buckets at said juncture for the mixing therein of said fluid and air, an orifice formed at the peripheral edge of said outer bucket and said nozzle having a diverging terminus protruding therethrough for the discharge of said mixture in a direction diagonally opposite from that of said impingement and partially rearward and partially opposite to the rotational direction of said wheel.

2. In a turbine engine for converting the energy in a high-temperature, high-pressure fluid into power, a casing for supporting an assembly of wheels mounted in increasing diametered stages on a shaft, the wheel of the first-stage having mounted thereupon a plurality of structures comprised of an outer and an inner bucket joined to each other but having an enveloping air space therebetween, said outer bucket being comprised of walls having a base, a front and a rear side and an advancing and a trailing end relative to the direction of rotation, and said inner bucket being comprised of walls forming a base, a front and rear side and an advancing and trailing end, an aperture formed in the front wall of each of said buckets and a conduit extending inwardly therethrough, a pocket formed in the basal section of said inner bucket by the juncture of said trailing end with said rear side for receiving the impingement of said fluid thereagainst, said inner bucket walls thereafter continuing radially, arcuately and helically from said base and having progressively reducing cross-sectional dimensions as the radius thereof increases to provide surfaces for increasing the velocity and pressure of said fluid and for changing its flow throughout the arcuate and helical length of said walls from the direction of rotation to that of opposite to rotation, said wheel having a hub section opening to atmosphere and a plurality of channels commencing in said hub and extending through the wheel's periphery, each outer bucket having openings in its base matching the peripheral ends of said channels for the passage of air into the space between said buckets, said inner bucket presenting its entire outer area to said air for reducing the temperature of said fluid, a nozzle secured to the periphery of the inner bucket and the inner surface of the outer bucket for the mixing of said fluid and air therein, an orifice formed in the peripheral extremity of said outer bucket, a second-stage wheel spaced from said first-stage wheel and having buckets mounted peripherally thereupon, an assembly of stator cups having an entrance and a discharge end and being mounted on the inner wall of said casing between said wheels, said nozzle having a diverging terminus extending through said orifice for directing the joint discharge of said fluid and air in a direction opposite to the rotational direction of said wheels into said stator cups.

3. The structure as described in claim 2 wherein each of said wheels has formed on the forward and rearward sides thereof an annular recess which extends inwardly from the wheel's periphery, said buckets being positioned transversely across said periphery and having extension sides for occupying said recesses and means for securing said sides to said wheel thereat.

4. The structure as described in claim 2, wherein said nozzle has walls comprising a central intake opening for receiving the fluid from the radial terminus of said inner bucket and an outwardly extending flared section for receiving air therethrough from atmosphere, said flared section being connected by spokes with the walls comprising said intake opening and abutting and being made secure to the inner surface of said outer bucket adjacent the radial extremity thereof, the walls comprising said intake opening extending a distance inwardly from said spokes and terminating at a construction having a bell-shaped end for creating turbulence in said air, said nozzle having a diverging port comprised of walls fitting said orifice for the joint discharge therethrough of said fluid and air in a direction substantially opposite to that of the wheel's rotation.

5. The structure as described in claim 2 wherein said wheel has a hub and a plurality of air-flow passageways therethrough having openings that parallel said shaft, an annular duct having a bell-shaped end opening to atmosphere, said duct being spaced concentrically from and paralleling said shaft, a fan mounted on said shaft in said duct for propelling air toward said openings, said passageways curving right angularly within said hub and branching toward the sides and periphery of said wheel to emerge as openings therethrough.

6. The structure as described in claim 2 wherein a flanged ring positioned at the maximum radius of said conduit projects outwardly from the forward side of the outer bucket, said ring being comprised of a multiplicity of segments to form when all buckets are mounted in their prescribed positions a close-fitting canopy for guiding said fluid into said buckets.

7. The structure as described in claim 2 wherein said outer bucket is mounted to spatially envelop said inner bucket, the area defined by the walls of the inner bucket decreasing as the radius thereof increases and the area defined by the walls of said outer bucket increasing as the radius thereof increases, said buckets being fixedly spaced from each other by spider formations secured to each bucket, the forward side of said outer bucket converging in its peripheral area to direct into said nozzle the air induced centrifugally to flow through the space between said buckets.

8. The engine as described in claim 2 wherein said stator cups have a wide-mouth entrance, a deep rounded back for changing the flow direction of said fluid and air mixture, said cups having a narrow-mouth outlet formed by converging walls facing in a direction substantially opposite to that in which said mixture was discharged into said cups for directing it into buckets mounted on the next increased diametered wheel, said outlet having a side paralleling that of said increased diametered wheel and being mounted on the inner wall of said casing between and in close proximity to each of said wheels.

9. The turbine engine as described in claim 2 wherein said assembly of wheels includes a second-stage wheel having mounted on its periphery a plurality of buckets comprised of a base, a forward and a rear side wall, an end wall advancing and an end wall trailing relative to the direction of rotation of said assembly, an aperture formed in said forward wall in the basal section thereof, said aperture facing the discharged end of said stator cups, a pocket formed within the basal section of said buckets at an angle relative to the orbital travel of said wheel for receiving from said stator cups said fluid-air mixture thereagainst, said buckets housing an arcuately and helically formed structure having progressively reducing cross-sectional dimensions from its base to its periphery for changing therein the direction of flow of said mixture from that of rotation to that of opposite to rotation, said structure abutting and being supported by said advancing wall, the sides and end walls of said buckets converging to a trailing edge at the periphery of said rear side, an orifice formed at the juncture of said walls, said orifice facing in a partially rearward and partially opposite-to-rotation direction for the discharge of said mixture therethrough.

10. In a turbine engine for converting the energy in a high-temperature, high-pressure fluid into power, a casing for supporting an assembly of rotatable wheels mounted in increasing diametered stages on a shaft, the first-stage wheel carrying peripherally thereupon a plurality of structures comprising an inner and an outer bucket and having an air space therebetween, said inner bucket being adapted to receive therein the impingement of said fluid thereagainst and said outer bucket being adapted to pass air from atmosphere into said passageway for reducing the temperature of said fluid, a nozzle fitted at the radial extremity of the inner and outer buckets for separately receiving said fluid and said air and effecting the mixture thereof prior to its discharge in a direction opposite to that in which said fluid was received, a ring of stator cups mounted on the inner surface of said casing and extending inwardly to receive the discharge of said mixture from said nozzles, a second-stage wheel spaced from the first wheel and having a plurality of bucket structures mounted peripherally thereupon, each of said second-stage bucket structures having a construction including an intake aperture for receiving said mixture from said stator cups in the direction of rotation, said construction having an arcuate and helical curvature for reversing the flow of said mixture therein and an orifice at the periphery thereof for the discharge in a direction opposite to that of rotation of said mixture therefrom, a second ring of stator cups mounted on the inner surface of said casing and extending inwardly for receiving said mixture in said opposite-to-rotation direction and redirecting it in the direction of rotation, further increased diametered stages of wheels secured on said shaft, each stage of wheels having a plurality of buckets mounted thereupon for receiving via said stator cups in the direction of rotation and at the minimum radius thereof said mixture from the buckets of a predecessor wheel and for altering the direction of its flow therewithin prior to its discharge from said buckets at the maximum radius thereof in an opposite-to-rotation direction.

11. The engine as described in claim 10 wherein the walls comprising said casing continue rearwardly a distance from the wheel having the greatest diameter, an annular wall having a lesser diameter than that of said rearwardly extending casing wall, said lesser diametered wall extending rearwardly a distance equivalent to that of and paralleling said casing wall to form therebetween an annular chamber for receiving therein the discharge of said mixture from the buckets of the greatest diametered wheel in a direction partially rearward and partially opposite to that of the rotation of said assembly.

References Cited in the file of this patent

UNITED STATES PATENTS

| | | |
|---|---|---|
| 746,388 | Scheffler | Dec. 8, 1903 |
| 765,806 | Benjamins | July 26, 1904 |
| 844,824 | Martin | Feb. 19, 1907 |
| 896,757 | Purvis | Aug. 25, 1908 |
| 1,255,002 | Flatau | Jan. 29, 1918 |
| 1,998,255 | Silbermann | Apr. 16, 1935 |
| 2,405,190 | Darling | Aug. 6, 1946 |
| 2,456,417 | Horsdal | Dec. 14, 1948 |
| 2,473,356 | Birmann | June 14, 1949 |
| 2,542,628 | Christopher | Feb. 20, 1951 |